Nov. 29, 1960  K. KORDESCH  2,962,540
CEMENT BONDED CATHODES
Filed Oct. 9, 1957

INVENTOR
KARL KORDESCH
BY John F. Hohmann
ATTORNEY

United States Patent Office 2,962,540
Patented Nov. 29, 1960

2,962,540

CEMENT BONDED CATHODES

Karl Kordesch, Lakewood, Ohio, assignor to Union Carbide Corporation, a corporation of New York Filed Oct. 9, 1957, Ser. No. 689,082

5 Claims. (Cl. 136—123)

This invention relates to bonded cathodes for use in dry cells. More specifically it relates to cathodes for use in those dry cells which employ a metallic container into which the cathodes of the invention may be fitted.

Cathode elements used in primary dry cells conventionally consist of mixtures of oxidic depolarizers, non-reactive conductive powders and, in some cases, a suitable electrolyte. The mixtures are molded or compressed into a bobbin or plate, and then inserted in the cells.

In most dry cell systems, graphite and acetylene black generally are the conductive powders. In other systems the conductive component in the cathode element may include metal powders such as nickel powder. The oxidic depolarizer may be manganese dioxide, nickel hydroxide, vanadium pentoxide and the like.

It has been discovered in accordance with the present invention that the efficiency of dry cells can be increased appreciably by maintaining a low level of resistance in the cathode by retaining the intimate physical bond between the cathode components during the entire service life of the cell. This has been achieved by incorporating in conventional dry cell cathode mixes a silicate binder matrix.

The principal object of the present invention then is to provide improved means and methods for maintaining a low level of resistance in cathodes during cell life by ensuring intimate contact between the components thereof.

Another object of the invention is to provide a bonded cathode which may be readily extruded into a metallic cell container.

Another object of the invention is to provide a bonded plate cathode adapted for use in stacked cell constructions.

The electrodes of the invention comprise finely divided particles of oxidic depolarizing material together with carbonaceous particles, an inorganic silicate binder, and, optionally, steel wool.

Among the oxidic depolarizing materials used in making, for various cell systems, the electrodes of the invention are manganese dioxide, mercuric oxide, silver oxide, copper oxide, vanadium pentoxide, nickel hydroxide and the like.

Suitable carbonaceous particles incorporated in the cathode of the invention include carbon black, acetylene black, graphite and mixtures thereof.

The cement binder employed, in an amount ranging from 5 to 20 percent by weight of the cathode weight, may be Portland cement, "Sorel" cement (a mixture of magnesium oxide and magnesium chloride) as well as various calcium aluminum silicates, which do not affect cell operation, owing to their inertness to the ambient electrolyte.

The cement material integrally unites the depolarizer and cathodic particles, and constitutes a substantially continuous common matrix for both types of particles. Optionally, the cathodes of the present invention may contain from 2 to 20 percent of their weight of steel wool or other filamentary conductive materials, the lengths of which exceed their diameters.

Figure 1:
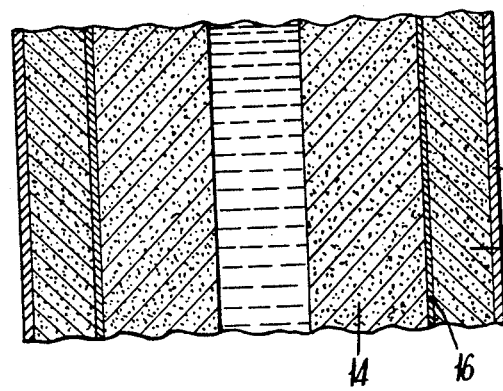
Fig. 1 is a fragmentary view of cell using a cathode made in accord with the invention.

Referring now to Fig. 1, there is shown a fragment of a cell consisting of a shaped cement bonded cathode 10, fitting in a steel can 12, and separated from anode 14, by means of a separator 16. The anode shown is of the type described and claimed in the co-pending application of E. E. Leger, Serial No. 689,086, filed October 9, 1957. This anode is composed of aggregates of consumable metal held in a semi-rigid state by a binding agent compatible with the electrolyte. It should be understood, however, that the herein-described cathode can be used also in conjunction with conventional cell constructions using sheet anodes.

The following examples illustrate the practice of the invention.

Example I

A cathode was made from the following mix:

|  | Grams |
|---|---|
| Electrolytic manganese dioxide | 200 |
| Graphite | 40 |
| Portland cement | 20 |
| Steel wool | 10 |

The above mix was moistened with from 10 to 12 milliliters of 9 normal potassium hydroxide per 100 grams of mix. The mix was then pressed into shape, and allowed to dry for one day.

Example II

Cathodes were made from the following mix:

|  | Grams |
|---|---|
| Copper oxide | 100 |
| Graphite | 20 |
| Portland cement | 20 |
| Potassium hydroxide | 4.2 |

Tubular cathodes such as that shown on Fig. 1 were made from 60 grams of the above mix by extrusion into a cell container and formed to have a ⅛ inch wall thickness. They were used to fabricate exceptionally efficient "D" size copper oxide zinc cells having a capacity of more than 15 ampere hours.

Example III

Cathodes were made from a mix of the following composition:

| | |
|---|---|
| Electrolytic manganese dioxide | 100 grams (particle size over 10 microns). |
| Graphite | 20 grams (particle size below 5 microns). |
| Portland cement | 15 grams. |
| Water | 13 milliliters. |

Thirty-five grams of the above mix were formed into a cylinder having an inner diameter of 1¼ inches, a wall thickness of ⅛ inch and a length of 2⅛ inches. The article was formed under pressure of about 1½ tons but well below 10 tons per square inch. These cathodes were used in "D" size cells with zinc anodes, and saturated ammonium chloride as the electrolyte. Their performance was as follows:

| | | |
|---|---|---|
| Open circuit voltage | volts | 1.53 |
| Closed circuit voltage | do | [1]1.43 |
| After ½ hour | do | 1.34 |
| After 1 hour | do | 1.32 |
| After 2 hours | do | 1.27 |
| After 4 hours | do | 1.20 |
| After 6 hours | do | 1.15 |
| After 8 hours | do | 1.07 |
| After 10 hours | do | 1.03 |
| After 12 hours | do | 0.96 |
| After 14 hours | do | 0.88 |
| After 16 hours | do | 0.80 |
| After 18 hours | do | 0.75 |
| After 20 hours | do | 0.68 |
| After 22 hours | do | 0.48 |
| Initial resistance | ohms | 0.16 |
| Resistance at end | do | 0.4 |
| Amperes hours: To 0.9 volt | ampere hours | 4 |
| To 0.6 volt | do | 6 |

[1] Continuous discharge over 3 ampere bulb.

By contrast, the "D" size Lechanché cell discharged under the same conditions produced 1.25 ampere hours to 0.9 volt and 2.5 ampere hours to 0.6 volt.

Figure 3:
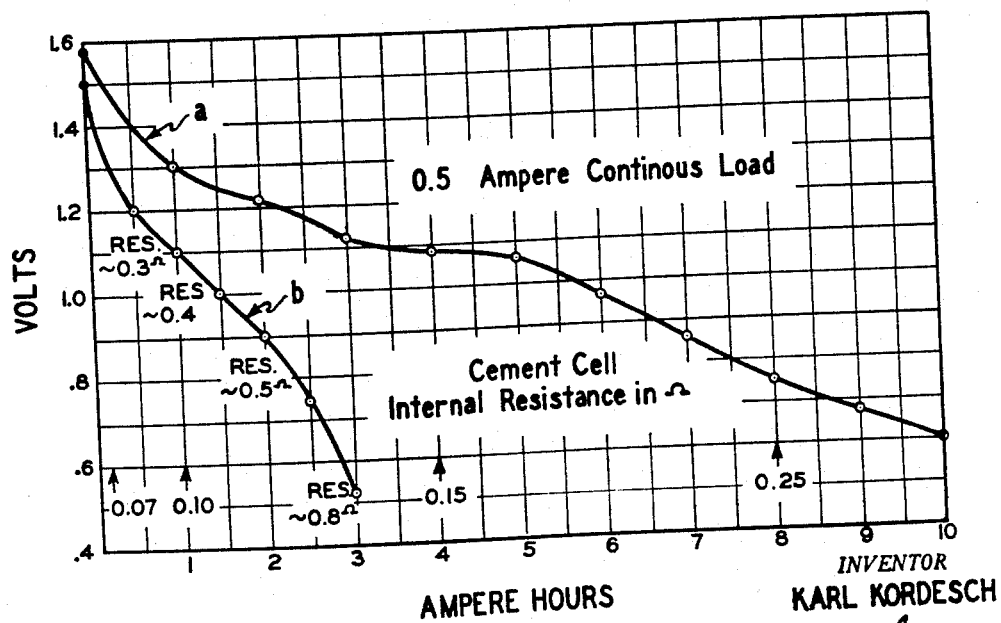
Fig. 3 is a graph comparing the performance of "D" size Leclanché cells using the cathodes of the invention with cells of the same size using unbonded cathodes.

The curves of Fig. 3 indicates a comparison between cells using the cathode of the invention with commercial photoflash cells, both being under an 0.5 ampere continuous load. Curve "a" shows the performance of a "D" size cell containing the cathode of the invention in conjunction with an alkaline electrolyte, while curve "b" shows the same for an identical cell using an unbonded cathode.

It should be noted from these curves that even after only one ampere hour the cell using the herein-disclosed cathode exceeds the voltage of a conventional cell by 0.2 volt. After three ampere hours, the latter gives a voltage reading less than that shown by the former after ten hours.

As also shown by Fig. 3, the internal resistance of the cell using a bonded cathode goes from 0.07 initially to 0.25 ohm after 8 ampere hours; the internal resistance of the cell using an unbonded cathode rises to about 0.8 ohm after only 3 ampere hours.

Figure 2:
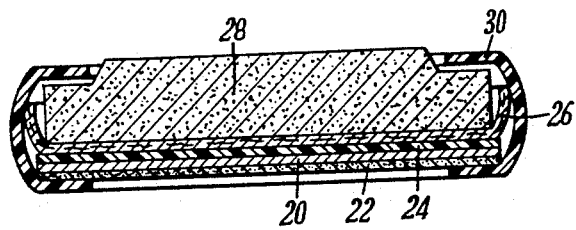
Fig. 2 is a vertical sectional view of a bonded plate cathode for use in stacked cells.

It should be understood that cathodes of any desired shape dictated by the geometry of the cells wherein they are intended to be used, may be fabricated in accordance with the invention. Thus there is shown in Fig. 2 a bonded plate cathode for use in flat stacked cells. Suitably such a construction comprises a zinc anode 20, having a conductive carbon coating 22, and a film liner 24, a paper blanket 26, and a cement bonded cathode mix cake 28, the entire unit being enveloped by a vinyl envelope 30.

Similarly the cathodes of the invention can be used in various cell systems, including storage cells employing, for example, an alkaline electrolyte in conjunction with manganese dioxide and zinc. In this application, cells often show a considerable deficiency of electrolyte after discharge. This undesirable condition may be remedied by employing a modified mode of fabrication to produce cathodes which are more porous and elastic than those hereinabove described. The following example describes such mode of fabrication:

*Example IV*

A mix containing 100 g. $MnO_2$, 20 g. graphite, 10 g. Portland cement and 12 ml. KOH is pressured into a cake. After one day setting, this mass is pulverized and sieved (through 25 to 50, on 100 mesh) then moistened with KOH and molded into the electrode shape. A small graphite and cement addition (about 1 g. of each) during the rebonding gives a better conductivity and higher strength, but is not absolutely necessary since the original cement mix binds again if put under pressure as the hydration continues for a period of several weeks.

While the invention has been described with special reference to particular embodiments thereof, it will be understood that variations from the specific details disclosed herein can be effected without departing from the concept of the invention in its broadest aspect.

What is claimed is:

1. A shaped cathode for dry cells, said cathode comprising finely divided carbonaceous particles, and finely divided oxidic depolarizing particles, said particles being integrally united by an inorganic cement, said cement constituting a substantially continuous common matrix for both depolarizing and carbonaceous particles, and being present throughout said cathode in an amount ranging from 5 percent to 20 percent by weight thereof.

2. The cathode of claim 1 additionally characterized by the presence therein of from 2 to 20 weight percent of steel wool.

3. The cathode of claim 1 wherein said inorganic cement is "Sorel" cement.

4. The cathode of claim 1 wherein said cement is Portland cement.

5. A cement-bonded cathode comprising finely divided carbonaceous particles, finely divided oxidic depolarizing particles, and from 2 to 20 percent by weight of conductive filamentary particles, all of said particles being integrally united by Portland cement, said cement constituting a substantially continuous common matrix for said particles and being present throughout said cathode in an amount ranging from 5 percent to 20 percent by weight thereof.

References Cited in the file of this patent

UNITED STATES PATENTS

| | | |
|---|---|---|
| 793,077 | Hubbell | June 27, 1905 |
| 1,017,483 | Brunt | Feb. 13, 1912 |
| 2,230,267 | Ruben | Feb. 4, 1941 |
| 2,252,277 | Tate et al. | Aug. 12, 1941 |
| 2,658,099 | Basset | Nov. 3, 1953 |
| 2,708,683 | Eisen | May 17, 1955 |
| 2,762,859 | Ostrander | Sept. 11, 1956 |

FOREIGN PATENTS

| | | |
|---|---|---|
| 17,861 | Great Britain | of 1890 |
| 653,235 | Great Britain | May 9, 1951 |